US009316831B2

(12) United States Patent  
Takahashi et al.

(10) Patent No.: US 9,316,831 B2  
(45) Date of Patent: Apr. 19, 2016

(54) HEAD MOUNTED DISPLAY AND DISPLAY CONTROL METHOD

(71) Applicant: Sony Corporation, Tokyo (JP)

(72) Inventors: Naomasa Takahashi, Chiba (JP); Yoichi Hirota, Kanagawa (JP); Yohsuke Kaji, Chiba (JP); Masaomi Nabeta, Tokyo (JP); Hiroaki Itou, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/349,725

(22) PCT Filed: Oct. 4, 2012

(86) PCT No.: PCT/JP2012/075778  
§ 371 (c)(1),  
(2) Date: Apr. 4, 2014

(87) PCT Pub. No.: WO2013/054728  
PCT Pub. Date: Apr. 18, 2013

(65) Prior Publication Data  
US 2014/0266989 A1    Sep. 18, 2014

(30) Foreign Application Priority Data

Oct. 11, 2011    (JP) .................................. 2011-223935

(51) Int. Cl.
| | |
|---|---|
| *G02B 27/01* | (2006.01) |
| *G09G 3/00* | (2006.01) |
| *H04N 13/04* | (2006.01) |
| *G02B 27/00* | (2006.01) |

(52) U.S. Cl.  
CPC .......... *G02B 27/017* (2013.01); *G02B 27/0093* (2013.01); *G02B 27/01* (2013.01); *G09G 3/001* (2013.01); *H04N 13/044* (2013.01); *H04N 13/0497* (2013.01); *G02B 2027/014* (2013.01); *G02B 2027/0118* (2013.01); *G02B 2027/0178* (2013.01); *G09G 2320/02* (2013.01); *G09G 2320/0271* (2013.01); *G09G 2340/00* (2013.01); *G09G 2360/144* (2013.01); *H04N 2213/008* (2013.01)

(58) Field of Classification Search  
CPC .................................................... G02B 27/017  
See application file for complete search history.

(56) References Cited

U.S. PATENT DOCUMENTS 5,986,813 A * 11/1999 Saikawa et al. ............... 359/630  
6,369,952 B1 * 4/2002 Rallison et al. ............... 359/630

(Continued)

FOREIGN PATENT DOCUMENTS

| JP | 5-300451 A | 11/1993 |
| JP | 08-079658 A | 3/1996 |
| JP | 2003-110967 A | 4/2003 |

(Continued)

*Primary Examiner* — Kent Chang  
*Assistant Examiner* — Chayce Bibbee  
(74) *Attorney, Agent, or Firm* — Hazuki International, LLC

(57) ABSTRACT

Provided is a head mounted display including a displaying unit to display an image, an image signal processing unit to process an image signal, a display control unit to perform an image quality adjustment of the image signal processed by the image signal processing unit, and to control a display in the displaying unit, a mounting sensor to detect whether an observer has mounted the apparatus, and a control unit to issue an instruction for the image quality adjustment of the image signal in the display control unit, in response to a detection result by the mounting sensor.

9 Claims, 7 Drawing Sheets

(56) References Cited

U.S. PATENT DOCUMENTS

| | | |
|---|---|---|
| 6,674,561 B2 | 1/2004 | Ohnishi et al. |
| 6,900,778 B1* | 5/2005 | Yamamoto .................. 345/8 |
| 2003/0063361 A1* | 4/2003 | Ohnishi et al. ............... 359/237 |
| 2006/0103591 A1* | 5/2006 | Tanimura et al. .............. 345/8 |

FOREIGN PATENT DOCUMENTS

| | | |
|---|---|---|
| JP | 2009-086133 A | 4/2009 |
| JP | 2010-252379 A | 11/2010 |
| JP | 2011-022447 A | 2/2011 |
| WO | 2007/094152 A1 | 8/2007 |

* cited by examiner

HEAD MOUNTED DISPLAY AND DISPLAY CONTROL METHOD

CROSS-REFERENCE TO RELATED APPLICATION

The present application is a national phase entry under 35 U.S.C. §371 of International Application No. PCT/JP2012/075778 filed Oct. 4, 2012, published on Apr. 18, 2013 as WO 2013/054728 A1, which claims priority from Japanese Patent Application No. JP 2011-223935 filed in the Japanese Patent Office on Oct. 11, 2011.

TECHNICAL FIELD

The technology disclosed in the description relates to a head mounted display that is mounted on the head of a user and is utilized for viewing an image, and a display control method thereof, in particular, to a head mounted display and a display control method that achieve a long life of a display device to be used for displaying right and left images.

BACKGROUND ART

There is widely known a displaying apparatus mounted on a head to view an image, that is, a head mounted display (HMD). The head mounted display has an optical unit for each of right and left eyes and is configured to be able to control the senses of sight and hearing when it is used with headphones. When it is configured so as to be completely cut off from the outside world at the time it is attached to the head, the virtual reality is increased at the time of looking and listening. Also, the head mounted display can reflect different images to right and left eyes, and, when images with disparity are displayed to the right and left eyes, it is possible to present a 3D image.

As display units for the right and left eyes on the head mounted display, it is possible to use a display panel of high resolution including, for example, a liquid crystal and an organic EL (Electro-Luminescence) device. Also, if an adequate angle of view in an optical system is set and the multichannel is realized by headphones, it is possible to realize the sense of presence similar to looking and listening in a movie theater.

It is known in the industry that if the display panel constituted by the liquid crystal, the organic EL device, or the like continues to display high luminance images, a burn-in phenomenon becomes likely to occur. Therefore, in the head mounted display, a display control method that achieves a long life of a display device by adjusting the luminance has been desired.

In the imaging technique field, there is widely known a technology that adjusts the luminance of a display screen depending on the illumination intensity (environmental light) in an installation environment of a displaying apparatus such as a television receiver or a projector, that is, in a viewing environment.

For example, there is proposed an image displaying apparatus that follows a change in feature quantity of input image signals and changes the dimming speed of the backlight source, based on the difference in the times necessary for the light adaptation and the dark adaptation (for example, see Patent Literature 1).

Also, there is proposed an image displaying apparatus that acquires the luminous environment in the surroundings using an illumination intensity sensor, and switches an image setting suitable for the surrounding environment without giving an audience a feeling of strangeness (for example, see Patent Literature 2).

Also, there is proposed an image displaying apparatus that sequentially calculates an image quality correction amount corresponding to a display luminance level, and thereby, even if the image luminance is controlled, allows a watcher not to feel that the image quality or visibility is degraded, based on the dark adaptation to brightness feeling of human eyes and time (for example, see Patent Literature 3).

However, either of the above-described conventional technologies does not intend to perform an adjustment of luminance for a head mounted display. In a displaying apparatus that directly covers eyes, such as a head mounted display with a light shielding feature, the viewer is in the same environment as being in a dark place. Therefore, after mounting the head mounted display, the dark adaptation occurs in the eyes of the viewer as a luminosity property. Furthermore, when mounting the head mounted display with a light shielding feature, the eyes of the viewer are shielded from environmental light, and therefore it makes no sense to measure the illumination intensity in the viewing environment.

CITATION LIST

| Patent Literature | |
|---|---|
| Patent Literature 1 | JP 2009-86133A |
| Patent Literature 2 | JP 2010-252379A |
| Patent Literature 3 | JP 2011-22447A |

SUMMARY OF INVENTION

Technical Problem

An object of the technology disclosed in the description is to provide an excellent head mounted display and display control method that can achieve a long life of a display device to be used for displaying right and left images, by performing a control of the luminance utilizing a view sensitivity property of a viewer who has mounted it.

Solution to Problem

The present application has been made in view of the above-described problems, and a technology according to claim 1 is a head mounted display including:

a displaying unit to display an image;

an image signal processing unit to process an image signal;

a display control unit to perform an image quality adjustment of the image signal processed by the image signal processing unit, and to control a display in the displaying unit;

a mounting sensor to detect whether or not an observer has mounted the apparatus; and a control unit to issue an instruction for the image quality adjustment of the image signal in the display control unit, in response to a detection result by the mounting sensor. In a technology according to claim 2 in the present application, the head mounted display according to claim 1 includes the displaying unit for each of the left eye and the right eye of the observer.

In a technology according to claim 3 in the present application, the head mounted display according to claim 1 further includes a light shielding hood to shield an eye of the observer from environmental light, above the displaying unit.

In a technology according to claim 4 in the present application, the control unit of the head mounted display according to claim 1 is configured to light the displaying unit and issue an instruction for an adjustment of luminance thereof, in response to the mounting sensor detecting that the observer has mounted the apparatus.

In a technology according to claim 5 in the present application, the control unit of the head mounted display according to claim 1 is configured to issue an instruction for an adjustment of luminance of the displaying unit, in accordance with dark adaptation of a luminosity property of an eye of the observer, in response to the mounting sensor detecting that the observer has mounted the apparatus.

In a technology according to claim 6 in the present application, the control unit of the head mounted display according to claim 4 is configured to issue an instruction for decreasing the luminance of the displaying unit, in response to an elapsed time since the mounting sensor has detected that the observer has mounted the apparatus.

In a technology according to claim 7 in the present application, the control unit of the head mounted display according to claim 4 is configured to set a target luminance value of the displaying unit after a predetermined elapsed time since the mounting sensor has detected that the observer has mounted the apparatus, based on setting of a reference luminance of 46 $cd/m^2$.

In a technology according to claim 8 in the present application, the control unit of the head mounted display according to claim 4 is configured to reset the luminance of the displaying unit to a value before the adjustment, in response to the mounting sensor detecting that the observer has demounted the apparatus.

A technology according to claim 9 in the present application is a display control method for a head mounted display, including:

an image signal processing step of processing an image signal to be displayed on the head mounted display;

a mounting detection step of detecting whether or not an observer has mounted the head mounted display; and a luminance adjustment step of performing an adjustment of luminance of the image signal, in response to a detection result in the mounting detection step.

Advantageous Effects of Invention

According to the technology disclosed in the description, it is possible to provide an excellent head mounted display and display control method that can achieve a long life of a display device to be used for displaying right and left images, by performing a control of the luminance utilizing a view sensitivity property of a viewer who has mounted it.

According to the technology disclosed in the description, in a head mounted display using a display device in which a burn-in is likely to occur, such as an organic EL device, it is possible to elongate a life of the display device and make a burn-in unlikely to occur, by decreasing the luminance in response to an elapsed time since a mounting, in consideration of a luminosity property, and as a result, it is possible to actualize a long life of the whole apparatus.

In a displaying apparatus that directly covers eyes, such as a head mounted display with a light shielding feature, a viewer is in the same situation as being in a dark place, and the dark adaptation occurs in the eyes of the viewer as a luminosity property. According to the technology disclosed in the description, it is possible to suppress the dazzle feeling of the viewer by performing a control of the luminance of the displaying unit corresponding to the luminosity property. As a result, the head mounted display allows for a long period of viewing such as a movie viewing or a game playing. In addition, by setting the target value of the controlled luminance to 46 $cd/m^2$ that is a reference value for digital cinemas, it is possible to make the same environment as a viewing in a dark movie theater, when the viewer has mounted the head mounted display.

Other objects, characteristics and advantages of the technology disclosed in the description will be revealed by embodiments described later and detailed explanations based on the appended drawings.

DESCRIPTION OF EMBODIMENTS

Hereinafter, preferred embodiments of the technology disclosed in the description will be described in detail with reference to the appended drawings.

Figure 1:
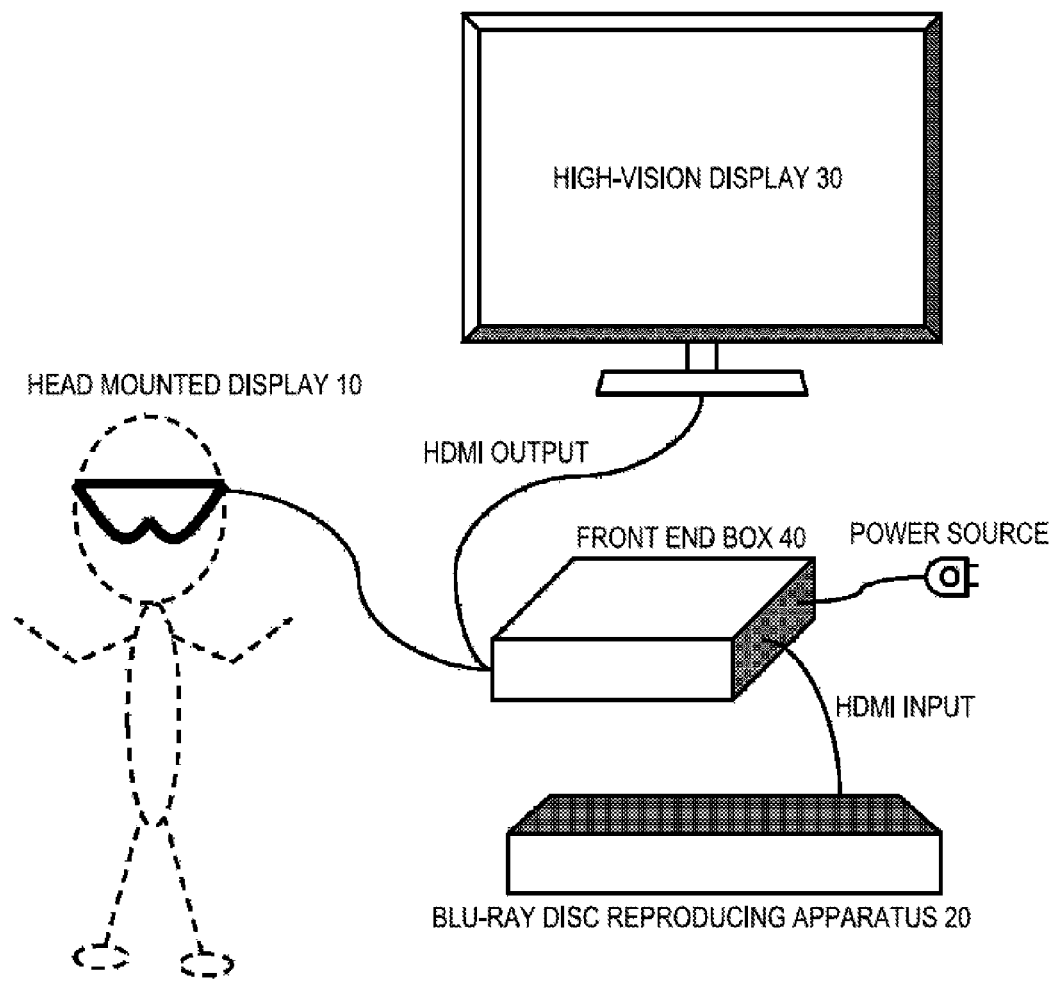
FIG. 1 is a diagram schematically illustrating a configuration of an image display system including a head mounted display.

FIG. 1 schematically illustrates a configuration of an image display system including the head mounted display. The system illustrated includes a head mounted display 10 itself, a Blu-ray disc reproducing apparatus 20 as a source of view content, a high-vision display (e.g. HDMI (High-Definition Multimedia Interface) television) 30 as other output destination of playback content of the Blu-ray disc reproducing apparatus 20, and a front end box 40 that performs processing of an AV signal output from the Blu-ray disc reproducing apparatus 20.

The front end box 40 corresponds to an HDMI repeater that, when receiving an HDMI input of an AV signal output from the Blu-ray disc reproducing apparatus 20, performs signal processing and HDMI output, for example. Also, the front end box 40 also denotes a two-way output switcher that switches the output destination of the Blu-ray disc reproducing apparatus 20 to one of the head mounted display 10 and the high-vision display 30. In the illustrated example, although the front end box 40 has two outputs, it may have three outputs or more. However, in the front end box 40, the output destination of AV signals is exclusive and the highest priority is assigned to an output to the head mounted display 10.

An HDMI cable connects between the Blu-ray disc reproducing apparatus 20 and the front end box 40 and between the front end box 40 and the high-vision display 30. Although it is possible to employ a configuration in which an HDMI cable connects between the front end box 40 and the head mounted display 10, cables of other specifications may be used to perform serial transfer of AV signals. However, it is assumed that AV signals and power are supplied by one cable connecting between the front end box 40 and the head mounted display 10, and the head mounted display 10 can acquire drive power through this cable.

The head mounted display 10 includes independent displaying units for right and left eyes. Each displaying unit uses, for example, an organic EL device. Also, the right and left displaying units each is equipped with a lens block including a wide viewing angle optical system with low distortion and high resolution.

Figure 2:
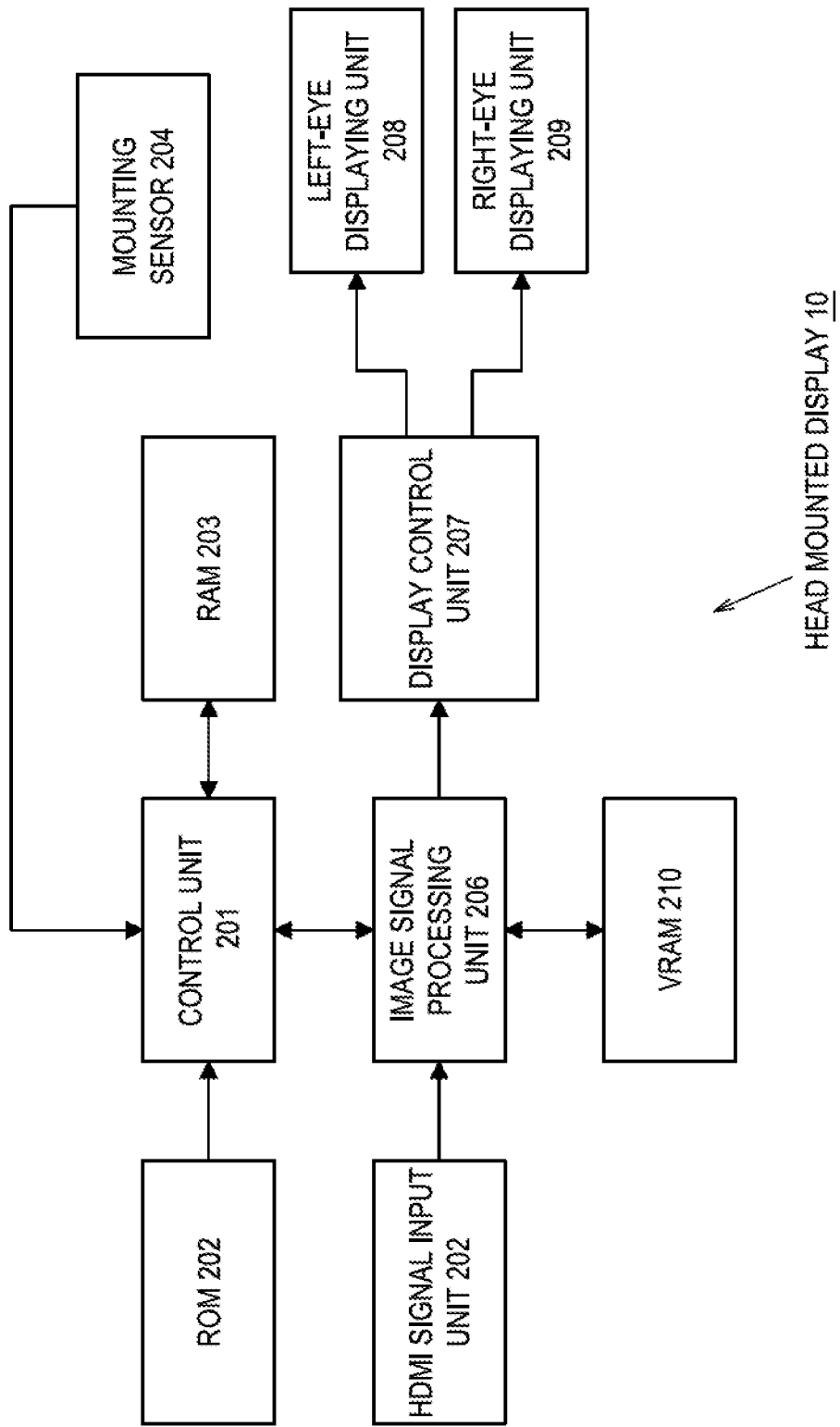
FIG. 2 is a diagram schematically illustrating the internal configuration of the head mounted display 10.

FIG. 2 schematically illustrates the internal configuration of the head mounted display 10. In the following, each unit will be described.

A control unit 201, which is constituted by, for example, a microprocessor, executes a control program stored in a ROM (Read Only Memory) 202 and controls the operation of the whole apparatus, using a RAM (Random Access Memory) 203 as a work area.

A mounting sensor 204 detects that a viewer has mounted the head mounted display 10 and that the viewer has demounted the head mounted display 10. When detecting a mounting or a demounting, the mounting sensor 204 generates an interrupt signal for the control unit 201. Responding to this, the control unit 201, as the corresponding interrupt process, issues an instruction for a luminance adjustment process (described later) corresponding to the dark adaptation at the time of a detection of a mounting or the light adaptation at the time of a demounting, to an image signal processing unit 206.

The image signal processing unit 206 performs signal processes such as decryption, scaling and noise reduction, for image signals that an HDMI signal input unit 205 receives from the front end box 40. The processed image signals are temporarily stored in a VRAM (Video RAM) 210.

A display control unit 207 outputs and displays the image signals temporarily stored in the VRAM 210, to a left-eye displaying unit 208 and a right-eye displaying unit 209. The left-eye displaying unit 208 and the right-eye displaying unit 209 are each equipped with a lens block (not shown in FIG. 2) to enlarge an image. The left and right lens blocks each include a combination of multiple optical lenses and perform an optical process of images displayed by display panels 224, 225. Images displayed on light-emitting faces of the left-eye displaying unit 208 and right-eye displaying unit 209 are enlarged when passing through the lens blocks, and are formed on the retinas of a user as large virtual images. Then, the fusion of the left-eye image and right-eye image is performed in the brain of the observing user.

The left-eye displaying unit 208 and right-eye displaying unit 209 are constituted by organic El devices, for example. It is known in the industry that an organic EL device is a device in which a burn-in by a fixed pattern is likely to occur. Concretely, in a device in which a burn-in is likely to occur, a higher display luminance increases the deterioration rate of each pixel, and increases the likelihood of occurrence of a burn-in. Therefore, it seems desirable to be interfered in a state in which the display luminance of the left-eye displaying unit 208 and right-eye displaying unit 209 is as low as possible. As described later, according to the embodiment, in the head mounted display 10 that is shielded from light, it is possible to make a state in which the luminance of the left-eye displaying unit 208 and right-eye displaying unit 209 is more suppressed, and to suitably prevent a burn-in of the device, by performing a luminance control in consideration of the dark adaptation of the luminosity property.

Figure 3:
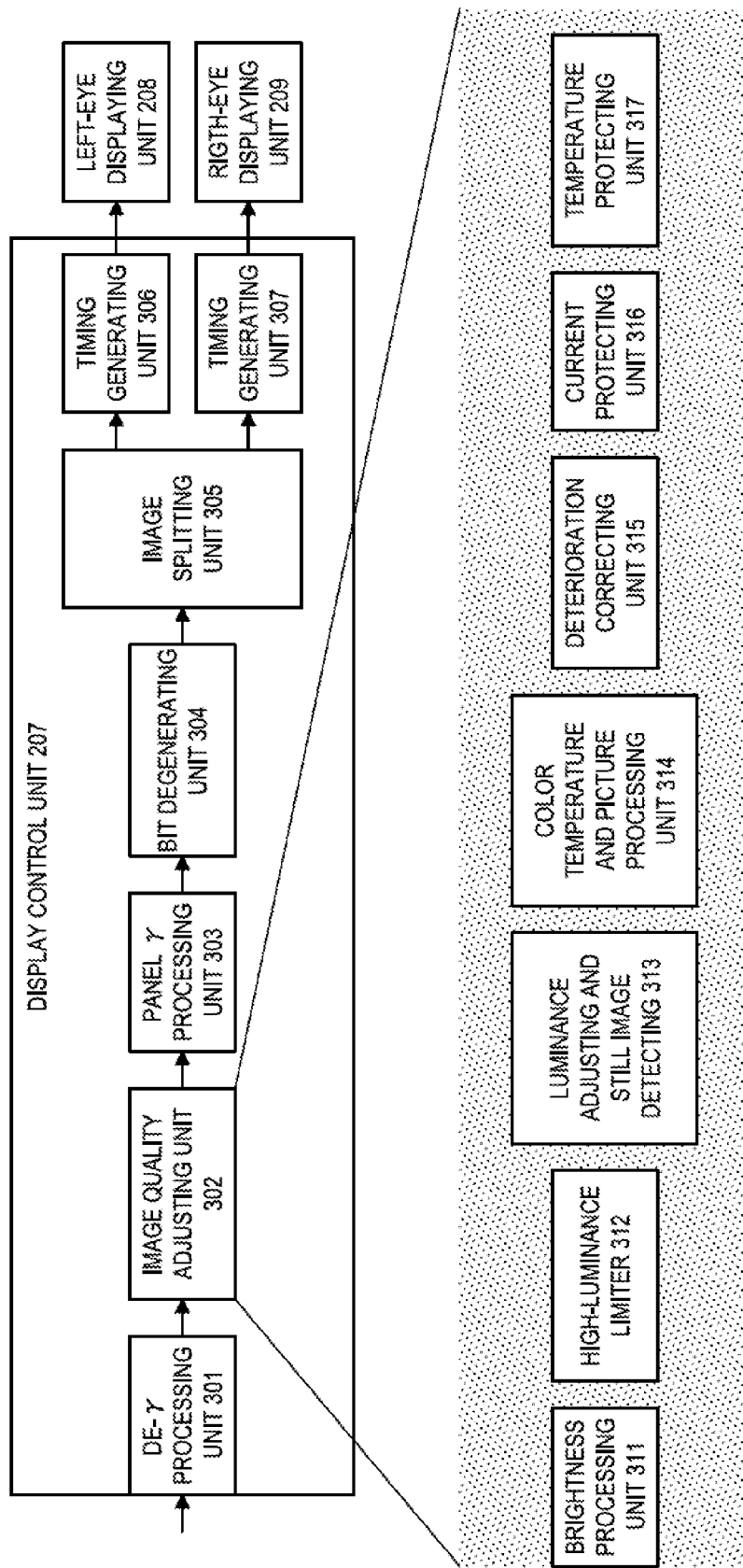
FIG. 3 is a diagram illustrating an exemplary configuration in a display control unit 207.

FIG. 3 illustrates an exemplary configuration in the display control unit 207. In the following, each unit will be described.

A degamma processing unit 301 performs a degamma process for the image signals input from the image signal processing unit 206, and converts them into, for example, linear RGB signals with a 14-bit width. An image quality adjusting unit 302 performs image quality adjustments such as luminance correction for the image signals in linear RGB format. A gamma processing unit 303 performs a gamma correction such that the image signals after the image quality adjustments are adapted for the property of the left-eye displaying unit 208 and right-eye displaying unit 209. A bit degenerating unit 304 performs, by a method such as error diffusion, a bit degenerating process of the linear RGB signals after the gamma correction, in accordance with the gradation level of the left-eye displaying unit 208 and right-eye displaying unit 209. An image splitting unit 305 splits the image signals into left-eye image signals and right-eye image signals. Timing generating units 306, 307 generate timing signals for outputting and displaying the left-eye image signals and right-eye image signals to the left-eye displaying unit 208 and right-eye displaying unit 209, respectively.

Also, FIG. 3 collectively illustrates an exemplary configuration in the image quality adjusting unit 302. The image quality adjusting unit 302 includes a brightness adjusting unit 311, a high-luminance limiter 312, a luminance adjusting and still image detecting unit 313, a color temperature adjusting and picture processing unit 314, a deterioration correcting unit 315, a current protecting unit 316 and a temperature protecting unit 317.

In the embodiment, when the mounting sensor 204 detects that a viewer has mounted the head mounted display 10, the luminance adjusting and still image detecting unit 313 performs a luminance adjusting process in response to elapsed times since the mounting, as a process corresponding to the dark adaptation. Details thereof will be described later.

Figure 4:
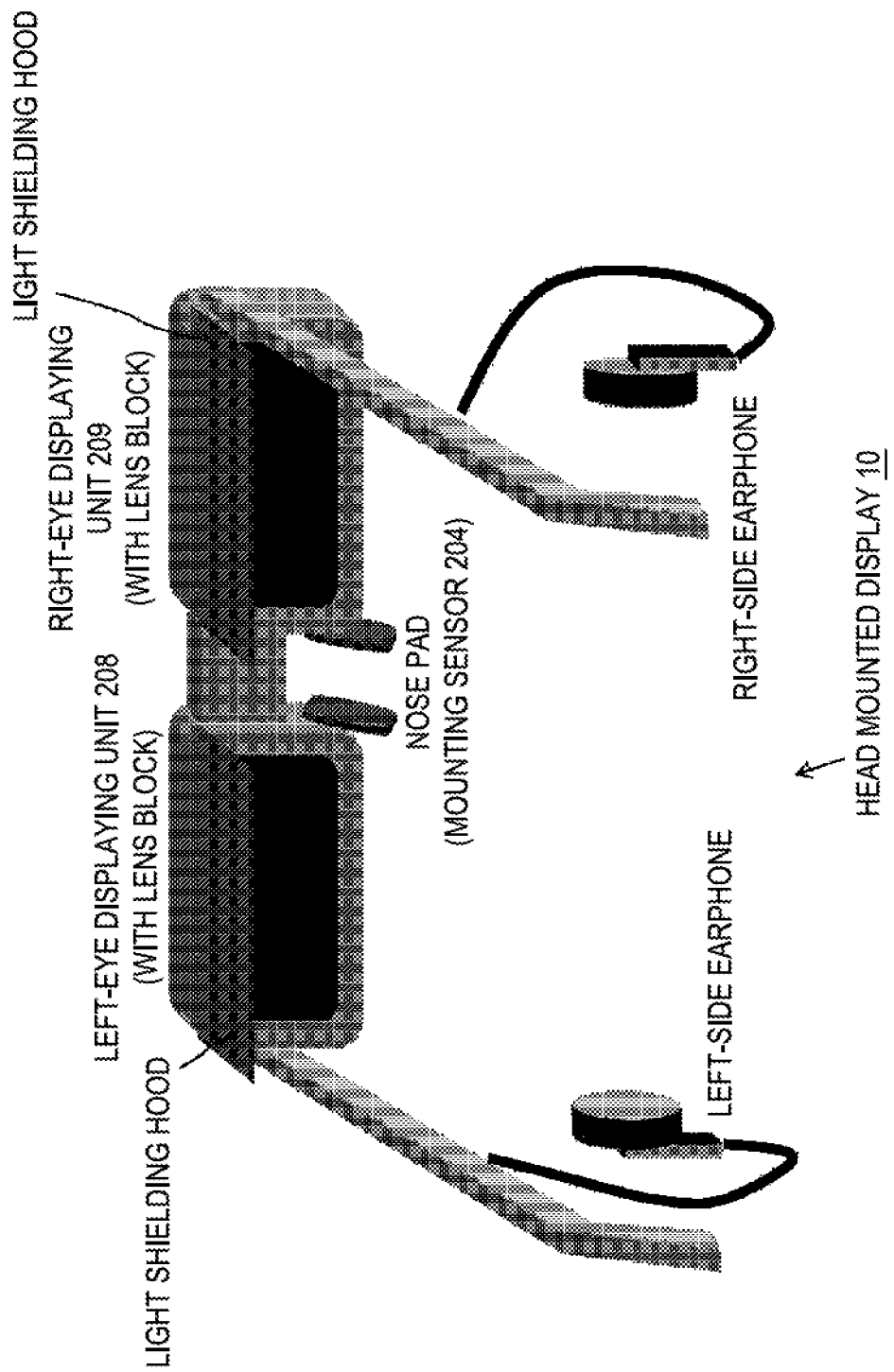
FIG. 4 is a diagram illustrating an exemplary apparent configuration of the head mounted display 10.

FIG. 4 illustrates an exemplary apparent configuration of the head mounted display 10. The head mounted display 10 shown in the figure is a structure similar to glasses for visual acuity correction, and the left-eye displaying unit 208 and right-eye displaying unit 209, along with the lens blocks (described above), are supported by a glass frame. A left-side earphone and a right-side earphone are attached to left and right temples, respectively. In the example shown in the figure, nose pads are used also as the mounting sensor 204, and have a mechanism in which the mounting is detected by the contact between the nose pads and the nose tip of the viewer. Once the nose pads come in contact with the nose tip of the viewer, the mounting sensor 204 turns on, and once departing from the nose tip, it turns off. Here, the configuration of the mounting sensor 204 is not limited to the above, and for example, it is allowable to provide a forehead pad near the center of the glass frame and use it also as the mounting sensor 204.

In the embodiment, light shielding hoods are attached above the left-eye displaying unit 208 and right-eye displaying unit 209, respectively. In a state in which the viewer has mounted the head mounted display 10, the light shielding hoods shield the left and right eyes from environmental light, and the viewing environment can be maintained nearly constant. That is, the head mounted display 10 is a device that directly covers the eyes of the viewer, and the viewer is put in the same situation as being in a dark place. Therefore, by mounting the head mounted display 10, the dark adaptation occurs in the eyes of the viewer as a luminosity property.

It is known that the luminosity property of human eyes is typically changed by the dark adaptation when viewing images under a dark environment such as a movie theater or a projecting apparatus. In consideration of this property, in a television receiver, projecting apparatus and the like, there is proposed a technology that measures environmental light and adjusts the luminance corresponding to the dark adaptation (described above).

In contrast, the head mounted display 10 includes the light shielding hoods, and thereby can set a viewing environment with a nearly-constant illumination intensity. Therefore, when performing a luminance control in consideration of the dark adaptation of the luminosity property, it is unnecessary to measure environmental light, unlike the case of a television receiver or a projecting apparatus. In the case of the head mounted display 10, by mounting it, the environmental light around the eyes of the viewer is changed, and therefore, by setting the mounting as a trigger and adjusting the luminance, it is possible to provide a viewing environment in consideration of the dark adaptation of the luminosity property.

In most cases, the viewer is in a bright environment when mounting the head mounted display 10, and it is assumed that the light adaptation is occurring in the eyes. Accordingly, before being mounted by the viewer (the light adaptation is occurring in the eyes), the head mounted display 10 puts the displaying units 208, 209 in a high luminance state, and waits. On the other hand, once the viewer mounts the head mounted display 10, the light shielding hoods shields the eyes of the viewer form environmental light and makes the same situation as being in a dark place, and then the dark adaptation occurs. Therefore, once the mounting sensor 204 detects the mounting by the viewer, the head mounted display 10 gradually (in response to elapsed times since the mounting) decreases the luminance of the displaying units 208, 209, in accordance with the dark adaptation. The decreasing of the luminance of the displaying units 208, 209 makes it possible to suppress the dazzle feeling of the viewer. As a result, it is possible to perform a long period of viewing such as a movie viewing or a game playing, with the head mounted display.

That is, the head mounted display 10 can induce a viewing in a lower luminance state, utilizing the dark adaptation. In the displaying units 208, 209 constituted by an organic El device or the like, which are devices in which a burn-in is likely to occur, a higher display luminance increases the deterioration rate of each pixel, and increases the likelihood of occurrence of a burn-in. According to the embodiment, in the head mounted display 10 that is shielded from light, it is possible to make a state in which the luminance of the left-eye displaying unit 208 and right-eye displaying unit 209 is more suppressed, to suitably prevent a burn-in of the device, and to actualize a long life, by performing the luminance control in consideration of the dark adaptation of the luminosity property.

Figure 5:
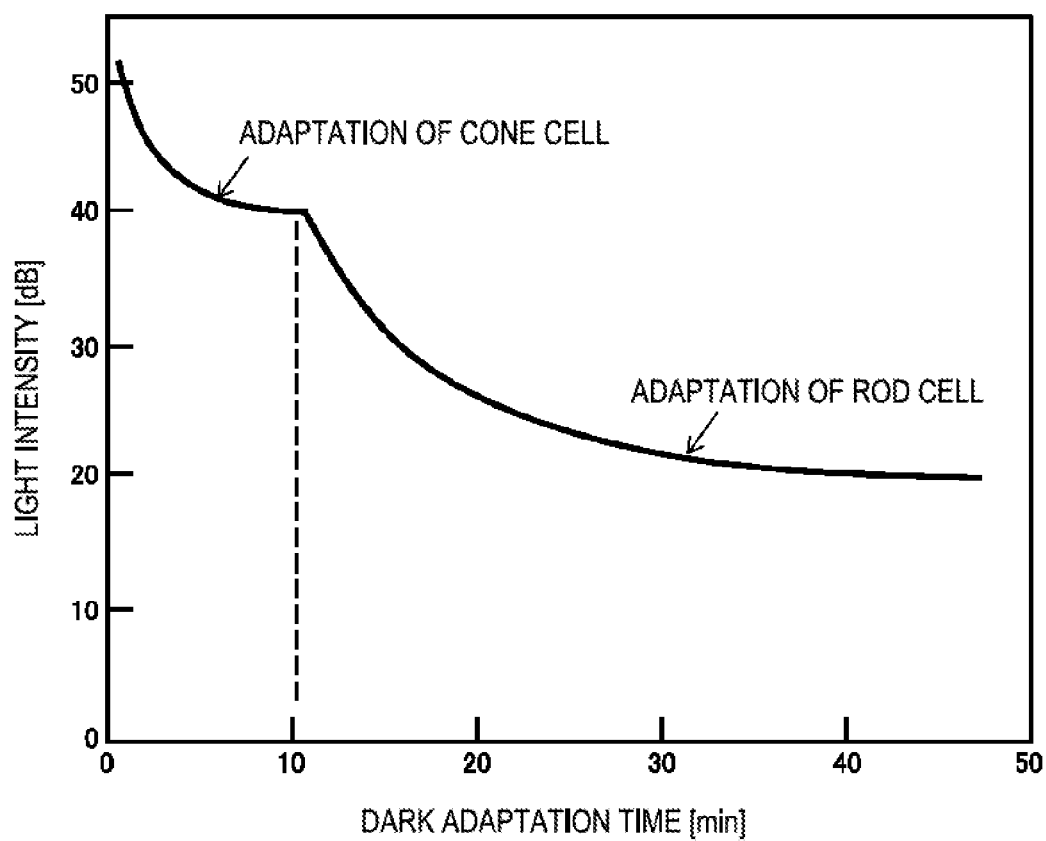
FIG. 5 is a diagram exemplifying a dark adaptation property of human eyes.

Here, the above-described "dark adaptation" is an autonomic function of animals that acts when an environment with a large amount of visible light is suddenly changed to an environment with a small amount, and although initially feeling that it is dark, the visual acuity is gradually secured with time. Visual cells in a retina come in rod cells responding to brightness and cone cells responding to color (wavelength). It is known that in the dark adaptation, the cone adaptation involving the luminosity property is performed in about 10 minutes and further the rod adaptation is almost completed in about 30 minutes. FIG. 5 exemplifies a dark adaptation property of human eyes.

Incidentally, the rod cell has a very high sensitivity to light and is sensitive to even one photon. The rod cell is susceptible to the whole range of the spectrum, and thereby a certain degree of visual acuity is shown even in a dark place. Conversely, in a bright environment such as daytime, the rod cell becomes in a saturation state by a massive amount of light, and does not function. The visual acuity of the rod cell is low, and detailed discriminations of an object are left to the cone cell. The rod cell comes in only one type, which has a peak at a wavelength of about 520 nanometers, therefore may not distinguish color by difference of wavelength, and distinguishes only light intensity, in other words, difference of brightness. Compared to the rod cell, the cone cell has a low sensitivity to light, and does not function during nighttime and the like in which the light amount is small. The visual acuity, which is mostly born by the cone cell, exhibits the maximum at the central fovea of a macula where the cone cells are particularly concentrated at a high density, and drastically decreases with distance from the central fovea longer.

Figure 6A:
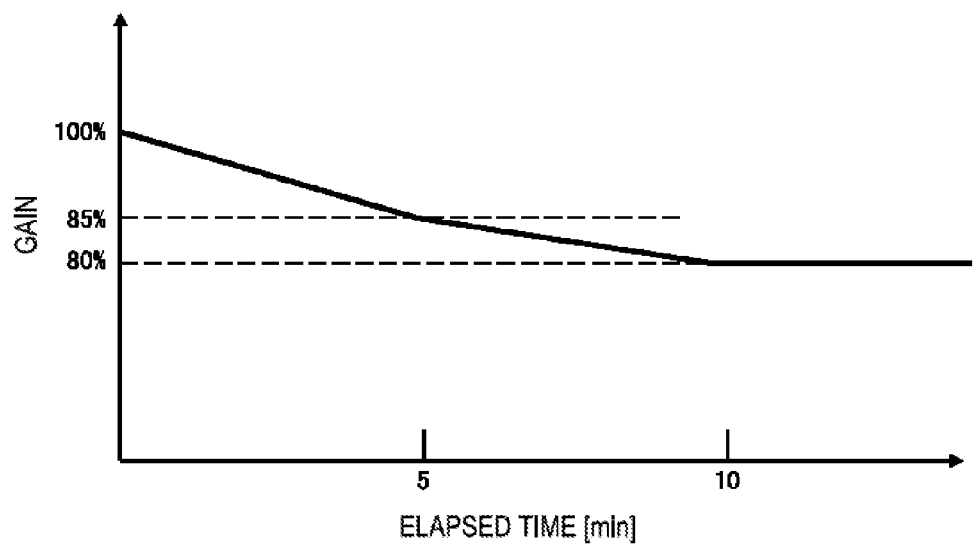
FIG. 6A is a diagram illustrating a manner in which the luminance is adjusted in response to elapsed times since a viewer has mounted the head mounted display 10.
Figure 6B:
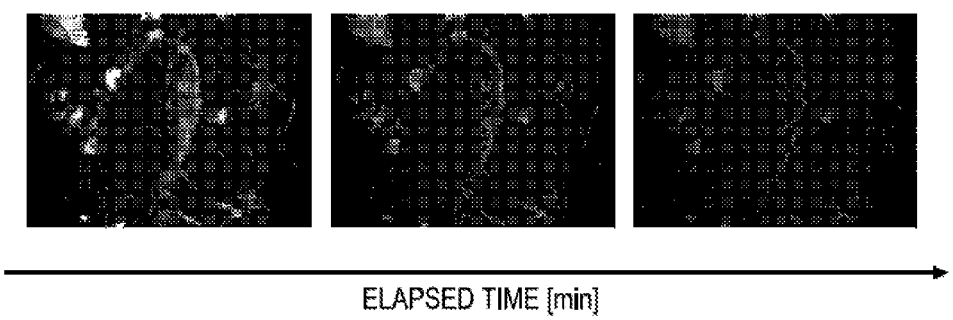
FIG. 6B is a diagram illustrating a manner in which the luminance is suppressed in response to elapsed times since a viewer has mounted the head mounted display 10.

The head mounted display 10 performs a luminance adjustment of the displaying units 208, 209, in accordance with the dark adaptation property shown in the figure. Considering that the main purpose is basically to view images, it is only necessary to adapt the cone cell responding to color, and it could be said that the luminance of the displaying units 208, 209 can be suppressed by a luminance adjustment for about 10 minutes. FIG. 6A illustrates a manner in which a luminance adjustment is performed in response to elapsed times since the viewer has mounted the head mounted display 10 (since a detection by the mounting sensor 204). In the example shown in the figure, in consideration of the sensitivity rise of the cone, the luminance is controlled so as to be drastically suppressed till about 5 minutes and thereafter gently suppressed from 5 minutes to 10 minutes. On this occasion, the target luminance value after 10 minutes can be set to, for example, 46 cd/m$^2$ that is a reference luminance for digital cinemas. Thereby, it is possible to bring the viewing environment by the head mounted display 10 close to a situation in which a movie is viewed. FIG. 6B illustrates a manner in which the luminance of a displayed image is suppressed in response to elapsed times since the viewer has mounted the head mounted display 10.

On the other hand, the "light adaptation" is a reverse autonomic function from the dark adaptation, and when an environment with a small amount of visible light is suddenly changed to an environment with a large amount, although initially feeling that it is bright, the visual acuity is gradually secured with time. There is a remarkable difference between the adaptation times of the dark adaptation and the light adaptation. The dark adaptation, as understood from FIG. 5, takes 10 to 30 minutes, whereas the light adaptation takes about 40 seconds for light in a room and 1 to 2 minutes even for sunlight in the open air. This is because the cone cell that acts in a bright place begins to act earlier than the rod cell that acts in a dark place.

As described above, before being mounted by the viewer (the light adaptation is occurring in the eyes), the head mounted display 10 puts the displaying units 208, 209 in a high luminance state, and waits. Since the light adaptation is completed within from several tens of seconds to at longest one minute, the luminosity property of the eyes is drastically changed when the viewer has demounted the head mounted display 10. Therefore, once the mounting sensor 204 detects the demounting by the viewer, the head mounted display 10 drastically increases the luminance of the displaying units 208, 209, and thereby, when the viewer mounts it next time, it is possible to perform a control corresponding to the light adaptation.

Figure 7:
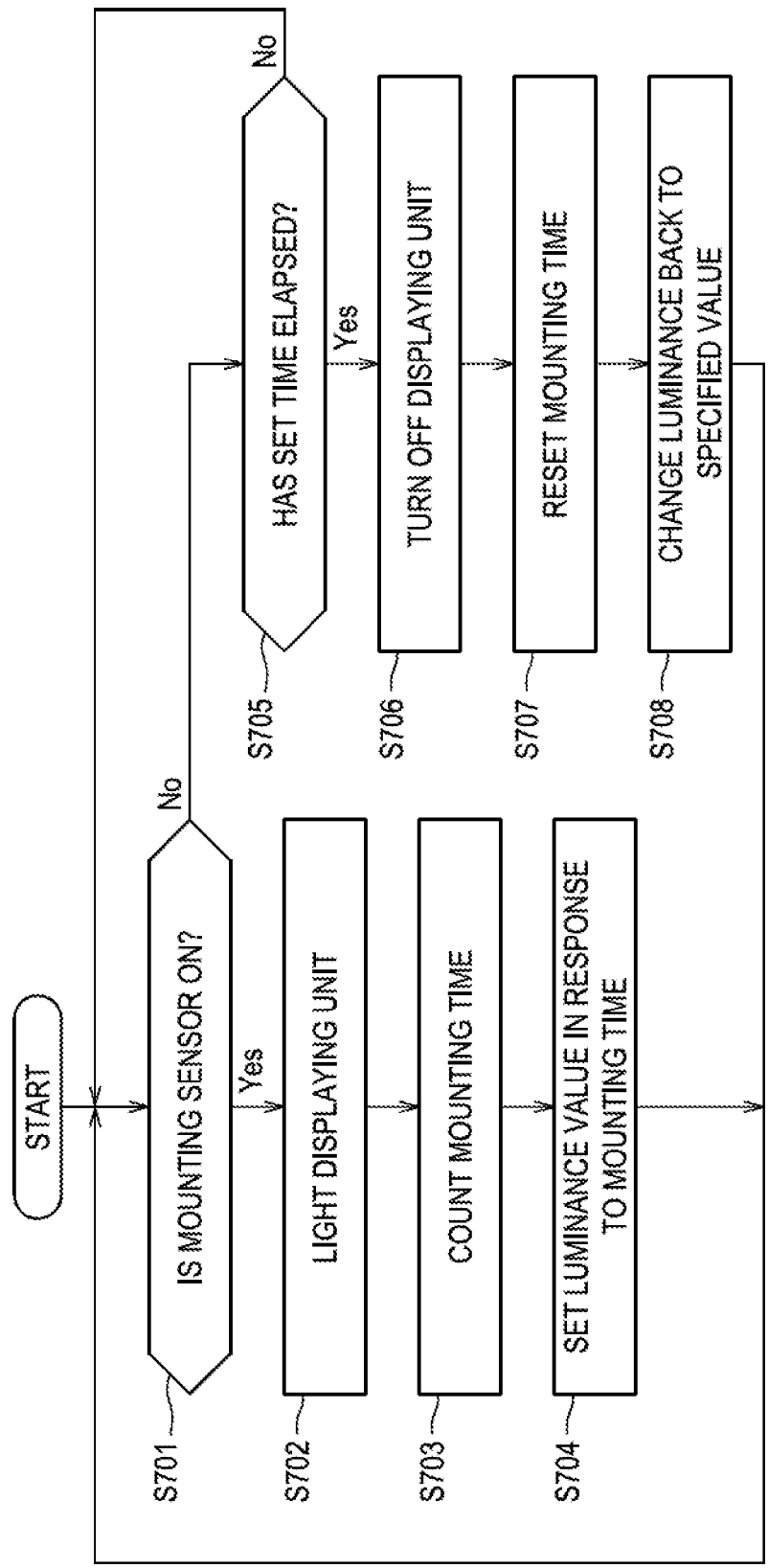
FIG. 7 is a flowchart illustrating procedures for performing a luminance adjustment in the head mounted display 10, in response to a mounting or a demounting by a viewer.

FIG. 7 illustrates procedures for performing the luminance adjustment in the head mounted display 10 in response to the mounting or the demounting by the viewer, in the form of a flowchart. For example, the control unit 201 executes the control program stored in the ROM 202, and thereby the procedures shown in the figure are implemented.

Once receiving an interrupt signal from the mounting sensor 204, the control unit 201 checks whether the observer has mounted the head mounted display 10 (step S701).

If finding that the observer has mounted the head mounted display 10 (in step S701, Yes), the control unit 201 issues an instruction for a lighting of the left-eye displaying unit 208 and right-eye displaying unit 209. In response to this, the left-eye displaying unit 208 and right-eye displaying unit 209 are lit at a high luminance (step S702).

Subsequently, the control unit 201 counts the elapsed time since the observer has mounted the head mounted display 10 (step S703). Then, the control unit 201, as shown in FIG. 6A, sets luminance values of the left-eye displaying unit 208 and right-eye displaying unit 209 in response to the elapsed time (step S704).

On the other hand, in step S701, If finding that the observer has demounted the head mounted display 10 (in step S701, Yes), when the time (within from several tens of seconds to at longest one minute) that is set for the light adaptation of the eyes of the observer has elapsed (in step S705, Yes), the control unit 201 issues an instruction for a turn-off of the left-eye displaying unit 208 and right-eye displaying unit 209. In response to this, the left-eye displaying unit 208 and right-eye displaying unit 209 are turned off (step S706). Then, the control unit 201 resets the mounting time counted before that (step S707), and changes the luminance value decreased in response to the mounting time, back to the former specified value (a high luminance value) (step S708).

When performing the luminance adjustment for the light adaptation by the turning-off of the mounting sensor 204, the luminance is not increased immediately, similarly to the luminance adjustment for the dark adaptation. This is because it is anticipated that depending on the motion of the head of the observer mounting the head mounted display 10, the mounting sensor 204 cannot normally detect it and may turn off. If the luminance were increased for the light adaptation in response to the mounting sensor 204 turning off by a false operation, the observer, in a state in which the luminosity is increased by the dark adaptation, would feel dazzled. Therefore, the luminance adjustment corresponding to the light adaptation is not performed until the set time has elapsed in step S705. However, at the instant of the elapse of a certain time, the luminance adjustment for the light adaptation, which is shorter than that of the dark adaptation, is performed.

In a displaying apparatus that directly covers eyes, such as a head mounted display with a light shielding feature, a viewer is in the same situation as being in a dark place, and the dark adaptation occurs in the eyes of the viewer as a luminosity property. As described above, according to the technology disclosed in the description, it is possible to suppress the dazzle feeling of the viewer by performing the control of the luminance of the displaying unit corresponding to the luminosity property. As a result, the head mounted display allows for a long period of viewing such as a movie viewing or a game playing. In addition, by setting the target value of the controlled luminance to 46 $cd/m^2$ that is a reference value for digital cinemas, it is possible to make the same environment as a viewing in a dark movie theater, when the viewer has mounted the head mounted display.

According to the technology disclosed in the description, the head mounted display 10 induces a viewing in a lower luminance state, utilizing the dark adaptation, and thereby, it is possible to make a state in which the luminance of the left-eye displaying unit 208 and right-eye displaying unit 209 is more suppressed, and to suitably prevent a burn-in of the device, and as a result, it is possible to actualize a long life of the whole apparatus.

Additionally, the present technology may also be configured as below.

(1)

A head mounted display including:

a displaying unit to display an image;

an image signal processing unit to process an image signal;

a display control unit to perform an image quality adjustment of the image signal processed by the image signal processing unit, and to control a display in the displaying unit;

a mounting sensor to detect whether an observer has mounted the apparatus; and a control unit to issue an instruction for the image quality adjustment of the image signal in the display control unit, in response to a detection result by the mounting sensor.

(2)

The head mounted display according to (1), including:

the displaying unit for each of a left eye and a right eye of the observer.

(3)

The head mounted display according to (1), further including:

a light shielding hood to shield an eye of the observer from environmental light, above the displaying unit.

(4)

The head mounted display according to (1), wherein the control unit lights the displaying unit and issues an instruction for an adjustment of luminance thereof, in response to the mounting sensor detecting that the observer has mounted the apparatus.

(5)

The head mounted display according to (1), wherein the control unit issues an instruction for an adjustment of luminance of the displaying unit in accordance with dark adaptation of a luminosity property of an eye of the observer, in response to the mounting sensor detecting that the observer has mounted the apparatus.

(6)

The head mounted display according to (4), wherein the control unit issues an instruction for decreasing the luminance of the displaying unit, in response to an elapsed time since the mounting sensor detects that the observer has mounted the apparatus.

(7)

The head mounted display according to (4), wherein the control unit sets a target luminance value of the displaying unit after a predetermined elapsed time since the mounting sensor detects that the observer has mounted the apparatus, based on setting of a reference luminance of 46 $cd/m^2$.

(8)

The head mounted display according to (4), wherein the control unit resets the luminance of the displaying unit to a value before the adjustment, in response to the mounting sensor detecting that the observer has demounted the apparatus.

(9)

A display control method for a head mounted display, the display control method including:

an image signal processing step of processing an image signal to be displayed on the head mounted display;

a mounting detection step of detecting whether or not an observer has mounted the head mounted display; and a luminance adjustment step of performing an adjustment of luminance of the image signal, in response to a detection result in the mounting detection step.

INDUSTRIAL APPLICABILITY

So far, the technology disclosed in the description has been described in detail with reference to the specific embodiment. Here, it is obvious that those skilled in the art can make alternations and substitutions of the embodiment in the scope without departing from the spirit of the technology disclosed in the description.

In the description, the embodiment in which the technology disclosed in the description is applied to a head mounted display has been mainly described. However, the spirit of the technology disclosed in the description is not limited to the configuration of the specific head mounted display. The technology disclosed in the description can be applied to various types of displaying apparatuses that have a light shielding feature and directly cover the eyes of a viewer, similarly. The device displaying images is not limited to a liquid crystal and an organic EL device, and the technology disclosed in the description is effective for various display devices in which a burn-in is likely to occur in an area with a large luminance-difference.

In the description, the embodiment in which the technology disclosed in the description is applied to a both-eye typed head mounted display that includes displaying units for both left and right eyes has been described. However, naturally, the technology disclosed in the description can be applied to a single-eye typed head mounted display that includes a displaying unit for only one of the left and the right, similarly.

In short, the technology disclosed in the description has been disclosed in the form of an example, and the described content in the description should not be interpreted in a limited way. To judge the spirit of the technology disclosed in the description, the appended claims should be considered.

REFERENCE SIGNS LIST 10 head mounted display
20 Blu-ray disc reproducing apparatus
30 high-vision display
40 front end box
201 control unit
202 ROM
203 RAM
204 mounting sensor
205 HDMI signal input unit
206 image signal processing unit
207 display control unit
208 left-eye displaying unit
209 right-eye displaying unit
210 VRAM
301 degamma processing unit
302 image quality adjusting unit
303 gamma processing unit
304 bit degenerating unit
305 image splitting unit
306, 307 timing generating unit
311 brightness adjusting unit
312 high-luminance limiter
313 luminance adjusting and still image detecting unit
314 color temperature adjusting and picture processing unit
315 deterioration correcting unit
316 current protecting unit
317 temperature protecting unit

The invention claimed is:

1. A head mounted display comprising:
a displaying unit to display an image;
an image signal processing unit to process an image signal;
a display control unit to perform an image quality adjustment of the image signal processed by the image signal processing unit, and to control a display in the displaying unit;
a mounting sensor to detect whether an observer has mounted the head mounted display; and
a control unit to issue an instruction for the image quality adjustment of the image signal in the display control unit, in response to a detection result by the mounting sensor,
wherein the control unit issues an instruction to increase luminance of the displaying unit, in response to the mounting sensor detecting that the observer has demounted the head mounted display.

2. The head mounted display according to claim 1, wherein the displaying unit is for each of a left eye and a right eye of the observer.

3. The head mounted display according to claim 1, further comprising: a light shielding hood to shield an eye of the observer from environmental light, above the displaying unit.

4. The head mounted display according to claim 1, wherein the control unit lights the displaying unit and issues an instruction for an adjustment of the luminance thereof, in response to the mounting sensor detecting that the observer has mounted the head mounted display.

5. The head mounted display according to claim 1, wherein the control unit issues an instruction for an adjustment of the luminance of the displaying unit in accordance with dark adaptation of a luminosity property of an eye of the observer, in response to the mounting sensor detecting that the observer has mounted the head mounted display.

6. The head mounted display according to claim 1, wherein the control unit issues an instruction for decreasing the luminance of the displaying unit, in response to an elapsed time since the mounting sensor detects that the observer has mounted the head mounted display.

7. The head mounted display according to claim 1, wherein the control unit sets a target luminance of the displaying unit after a predetermined elapsed time since the mounting sensor detects that the observer has mounted the head mounted display, based on setting of a reference luminance of 46 cd/m$^2$.

8. The head mounted display according to claim 4, wherein the control unit resets the luminance of the displaying unit to a value before the adjustment, in response to the mounting sensor detecting that the observer has demounted the head mounted display.

9. A display control method for a head mounted display, the display control method comprising:
an image signal processing step of processing an image signal to be displayed on the head mounted display;
a mounting detection step of detecting whether or not an observer has mounted the head mounted display; and
a luminance adjustment step of performing an adjustment of luminance of the image signal, in response to a detection result in the mounting detection step,
wherein the adjustment of the luminance corresponds to an increase in the luminance of the image signal, in response to the detection that the observer has demounted the head mounted display.

* * * * *